US011120707B2

(12) United States Patent
Hans et al.

(10) Patent No.: US 11,120,707 B2
(45) Date of Patent: Sep. 14, 2021

(54) COGNITIVE SNAPSHOTS FOR VISUALLY-IMPAIRED USERS

(71) Applicant: International Business Machines Corporation, Armonk, NY (US)

(72) Inventors: David F. Hans, Castleton, NY (US); Henry Damase Gorbsky, Garnerville, NY (US); James Ground, Jr., Wappingers Falls, NY (US); Ronald Earl Van Buskirk, II, Nederland, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 103 days.

(21) Appl. No.: 16/191,671

(22) Filed: Nov. 15, 2018

(65) Prior Publication Data
US 2020/0160748 A1    May 21, 2020

(51) Int. Cl.
| | |
|---|---|
| *G09B 21/00* | (2006.01) |
| *G06K 9/00* | (2006.01) |
| *G06F 3/16* | (2006.01) |
| *G06F 3/01* | (2006.01) |
| *G01C 21/20* | (2006.01) |
| *G06N 20/00* | (2019.01) |

(52) U.S. Cl.
CPC ......... *G09B 21/007* (2013.01); *G01C 21/206* (2013.01); *G06F 3/016* (2013.01); *G06F 3/167* (2013.01); *G06K 9/00201* (2013.01); *G06K 9/00671* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 7,202,851 B2* | 4/2007 | Cunningham | .......... | G06F 3/016 345/156 |
| 9,801,517 B2* | 10/2017 | High | .................... | G05D 1/0214 |

(Continued)

FOREIGN PATENT DOCUMENTS

| | | |
|---|---|---|
| CN | 101980515 A | 2/2011 |
| CN | 104983511 A | 10/2015 |
| CN | 204766392 U | 11/2015 |

*Primary Examiner* — Michelle M Entezari
(74) *Attorney, Agent, or Firm* — Cantor Colburn LLP; Tihon Poltavets (57) ABSTRACT

Systems, methods, and computer-readable media are described for providing machine-learning assistance to a user who may be visually-impaired in the form of cognitive snapshots taken of an environment. The visually-impaired user can be guided by a user application executing on a user device to position the user device to capture an image of a desired portion of an environment. Object recognition processing is performed on the captured image to identify objects present in the environment. An audible listing of the identified objects can be presented to the user. A delta between objects identified across different snapshots can be determined and an indication thereof can be presented to the user. The user application can guide the user towards a particular desired object by outputting an audible or haptic signal that increases in intensity as the user scans the user device towards a location of the object in the environment.

14 Claims, 4 Drawing Sheets

(56) References Cited

U.S. PATENT DOCUMENTS

| | | | | |
|---|---|---|---|---|
| 10,113,877 | B1* | 10/2018 | Schaefer | G06F 3/16 |
| 10,539,787 | B2* | 1/2020 | Haddick | G02B 27/0093 |
| 10,546,204 | B1* | 1/2020 | Kumar | G06K 9/3241 |
| 10,843,299 | B2* | 11/2020 | Billings | G06N 3/04 |
| 2011/0173539 | A1* | 7/2011 | Rottler | G06F 3/0482 |
| | | | | 715/727 |
| 2016/0321955 | A1* | 11/2016 | Zhu | G09B 21/007 |
| 2018/0001481 | A1* | 1/2018 | Shah | G06Q 20/00 |
| 2018/0114054 | A1* | 4/2018 | Dow | H04L 67/125 |
| 2018/0284894 | A1* | 10/2018 | Raut | G02B 27/017 |

* cited by examiner

COGNITIVE SNAPSHOTS FOR VISUALLY-IMPAIRED USERS

BACKGROUND

The present invention relates generally to cognitive-based assistance for visually-impaired users, and more particularly, to cognitive snapshots for visually-impaired users.

Many aspects of daily life depend on visual cues. Navigating public spaces and interacting with others can be particularly difficult for visually-impaired users who cannot take advantage of these visual cues. While there are existing solutions to assist such users who do not have the benefit of direct visual cues in performing daily tasks, such solutions suffer from a number of drawbacks, technical solutions to which are described herein.

SUMMARY

In one or more example embodiments, a method for providing machine learning-based assistance to a user is disclosed. The method includes receiving, at a user device, a voice command from the user to launch a user application on the user device. The method further includes guiding, by the user application, the user to position the user device such that a particular portion of an environment is within a field-of-view of an image sensor of the user device, and capturing, by the image sensor, an image of the particular portion of the environment. The method additionally includes identifying a collection of objects present in the captured image based at least in part on object recognition processing performed on the captured image and presenting, via the user device, an indication of the collection of objects to the user.

In one or more other example embodiments, a user device for providing machine learning-based assistance to a user is disclosed. The user device includes an image sensor, at least one memory storing computer-executable instructions, and at least one processor configured to access the at least one memory and execute the computer-executable instructions to perform a set of operations. The operations include receiving a voice command from the user to launch a user application on the user device. The operations further include guiding, by the user application, the user to position the user device such that a particular portion of an environment is within a field-of-view of an image sensor of the user device, and capturing, by the image sensor, an image of the particular portion of the environment. The operations additionally include identifying a collection of objects present in the captured image based at least in part on object recognition processing performed on the captured image and presenting an indication of the collection of objects to the user.

In one or more other example embodiments, a computer program product for providing machine-learning based assistance to a user is disclosed. The computer program product includes a non-transitory storage medium readable by a processing circuit, the storage medium storing instructions executable by the processing circuit to cause a method to be performed. The method includes receiving, at a user device, a voice command from the user to launch a user application on the user device. The method further includes guiding, by the user application, the user to position the user device such that a particular portion of an environment is within a field-of-view of an image sensor of the user device, and capturing, by the image sensor, an image of the particular portion of the environment. The method additionally includes identifying a collection of objects present in the captured image based at least in part on object recognition processing performed on the captured image and presenting, via the user device, an indication of the collection of objects to the user.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Example embodiments relate to, among other things, devices, systems, methods, computer-readable media, techniques, and methodologies for providing machine-learning based assistance to a user who may be visually-impaired. As used herein, a visually impaired user may be a user who is blind, legally blind, or otherwise has impaired vision that is not correctable using glasses or contact lenses. In example embodiments, when a visually-impaired user enters a public space (e.g., a supermarket), the user can submit a voice command or other form of input (e.g., a gesture-based command) to her user device to launch a user application on the user device. In example embodiments, the user application is configured to generate cognitive snapshots of the environment to assist the visually-impaired user in identifying objects and their relative placement within the environment. It should be appreciated that while example embodiments of the invention are described herein with respect to a user who is visually-impaired, embodiments of the invention are not limited to visually-impaired users but may be applicable to fully-sighted users or to users having another form of impairment (e.g., hearing-impaired users).

Upon launching the user application in response to the user command, a current location of the user device can be determined. Global positioning system (GPS) coordinates of the user device can be compared to stored location information to determine the current location of the user device. For instance, based on this comparison, the user application may determine that the user device is currently located at the supermarket located at 123 Maple Street. In example embodiments, a more precise determination of the location of the user device within the addressed location can be determined. In example embodiments, the user application may utilize beacon-based micro-GPS coordinates of the user device, potentially along with prior images captured within the addressed location, to determine a more precise location of the user device within the addressed location. For instance, the user application may determine that the user device is located in proximity to the bakery section of the supermarket located at 123 Maple Street. In example embodiments, the user device may provide audible output to the visually-impaired user indicating the current location of the user (e.g., "you are located near the bakery section at the supermarket located at 123 Maple Street").

In example embodiments, the user application guides the visually-impaired user to position the user device so that an image of a particular portion of the user's surrounding environment can be captured. Referring to the non-limiting example introduced above, the user application may guide the visually-impaired user to position the phone across from the bakery section of the supermarket so that an image thereof can be captured. The user application may cause the user device to provide audible, haptic, etc. prompts to the user to guide the user's positioning of the user device. Further, the user application may cause the user device to output an audible, haptic, etc. signal to the user that indicates when the device has been appropriately positioned. In example embodiments, the user device may then cause an image sensor (e.g., a camera) of the user device to automatically capture an image responsive to determining that the user device has been appropriately positioned. In other example embodiments, the visually-impaired user may submit a voice command prompting the user device to capture the image.

In example embodiments, the captured image is processed by a trained neural network or other machine-learning construct to perform object recognition on the captured image in order to identify a collection of objects present in the image. In example embodiments, a specialty neural network that has been specifically trained to detect objects typically associated with the captured scene (e.g., items typically found in a bakery section of a supermarket) may be used to process the image. In example embodiments, the specialty neural network outputs a probability classification distribution that classifies all objects detected in the image above a probability threshold. The user device may then present to the visually-impaired user an audible listing or the like of the identified collection of objects. In example embodiments, the visually-impaired user may be able to scroll the audible listing of objects using a wearable device such as a glove that includes proprioceptive sensors. In addition, in example embodiments, if the current location is within a threshold distance of a location at which a prior snapshot (e.g., image) was captured, the collection of objects identified in the prior snapshot may also be presented to the visually-impaired user.

In example embodiments, the visually-impaired user may wish to locate a particular object among the identified collection of objects. In such example embodiments, the visually-impaired user may submit a voice command to the user device indicating an intent to locate a particular object (e.g., "where are the cinnamon rolls?"). In response, the user application may instruct the visually-impaired user to scan the user device across the particular portion of the environment that was captured in the image (e.g., the bakery section of a supermarket) to facilitate identification of a more precise location of the desired object within the scanned environment. For instance, in example embodiments, the user application may cause the user device to output an audible or haptic signal that increases in intensity as the desired object approaches a field-of-view of the user device (e.g., a field-of-view of an image sensor of the user device). When the desired object becomes aligned with a reference location on the user device (e.g., a centerline within a field-of-view of a camera of the user device), the user device may output an audible or haptic signal indicating that the desired object has been located, thereby enabling the visually-impaired user to retrieve the desired object.

In certain example embodiments, upon capturing the image of the particular portion of the environment, the user application may prompt the visually-impaired user for input indicating what action the user wishes to take. For instance, the user application may ask the visually-impaired user if she would like to hear the listing of objects identified in the captured image or if she would like more information about a specific item such as its precise location in the environment, pricing information, availability, or the like. Further, in certain example embodiments, the user application may inquire as to whether the visually-impaired user would like to know what objects may have changed from a prior snapshot that was taken.

In example embodiments, the user application may be configured to determine a delta between the collection of objects identified in the captured image and a collection of objects identified in a prior snapshot of the same portion of the environment. For instance, the user application may determine which objects may have been removed or replaced with other objects in the bakery section between when the current image is captured and when the prior snapshot is captured. As another non-limiting example, the user application may identify an object that is typically available but which is not currently available due to being out-of-stock or sold-out. In certain example embodiments, the user application may perform a text-based comparison of a listing of objects identified in the captured image and a listing of objects identified in a prior snapshot. The user application may then present an indication of this delta between the two collections of objects to the visually-impaired user. For example, the user application may inform the visually-impaired user that cinnamon rolls are normally available but have sold-out or that sandwich rolls have been discontinued.

Illustrative methods in accordance with example embodiments of the invention and corresponding data structures (e.g., program modules) for performing the methods will now be described. It should be noted that each operation of the method 200 and/or the method 300 may be performed by one or more of the program modules or the like depicted in FIG. 1 or FIG. 4, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 1:
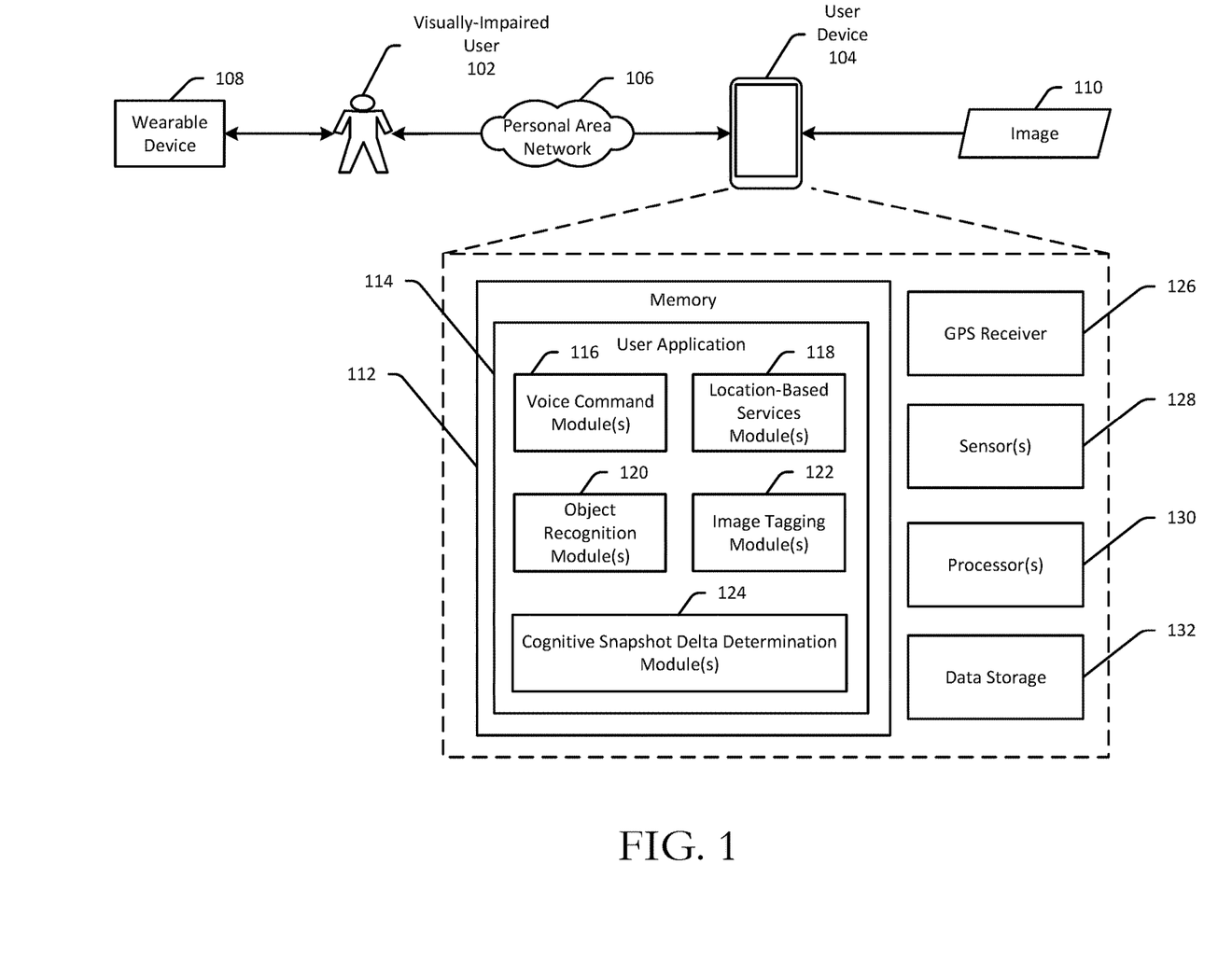
FIG. 1 is a schematic hybrid data flow/block diagram illustrating the generation of cognitive snapshots of an environment in accordance with one or more example embodiments.
Figure 2:
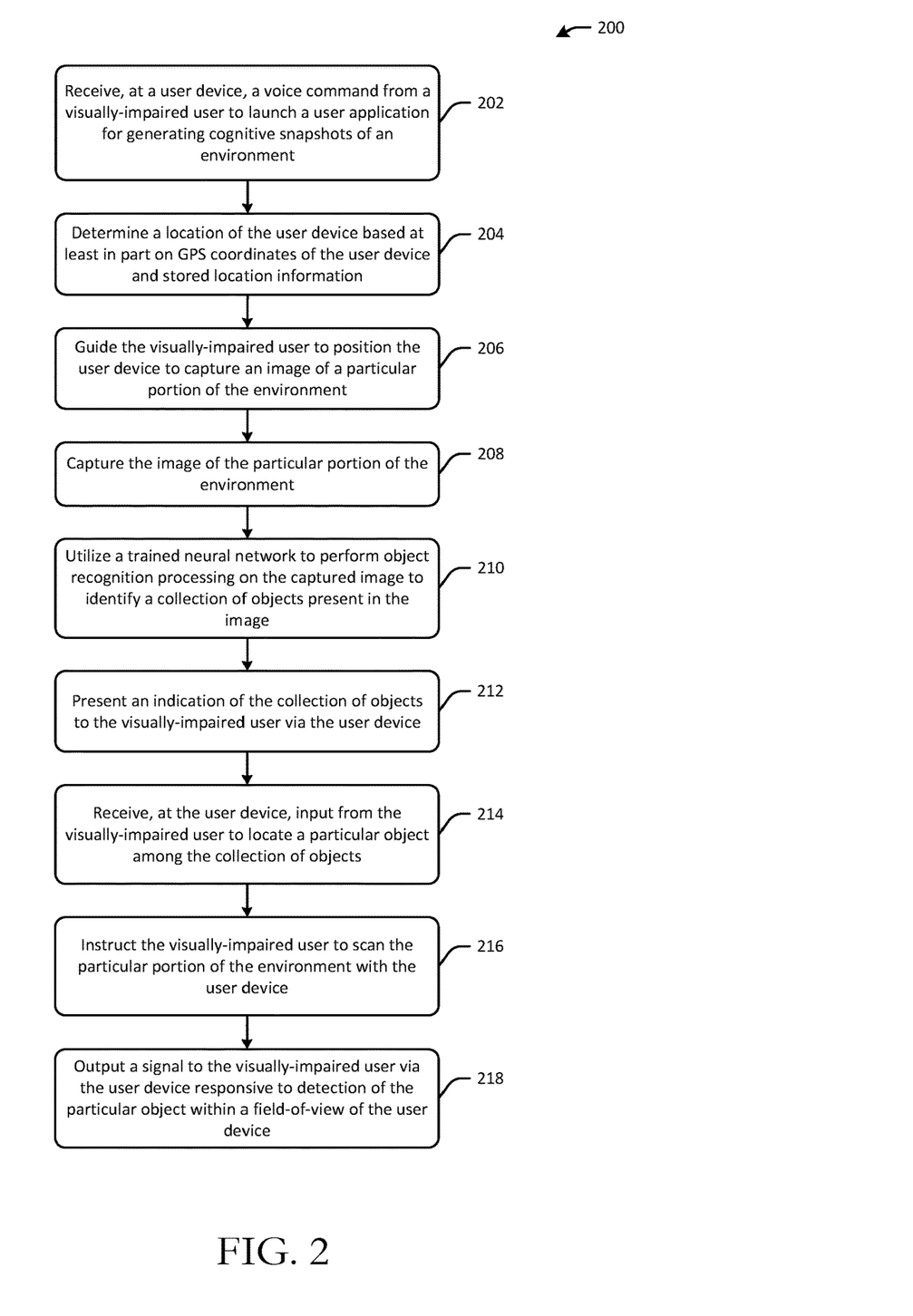
FIG. 2 is a process flow diagram of an illustrative method for generating a cognitive snapshot of an environment in accordance with one or more example embodiments.
Figure 3:
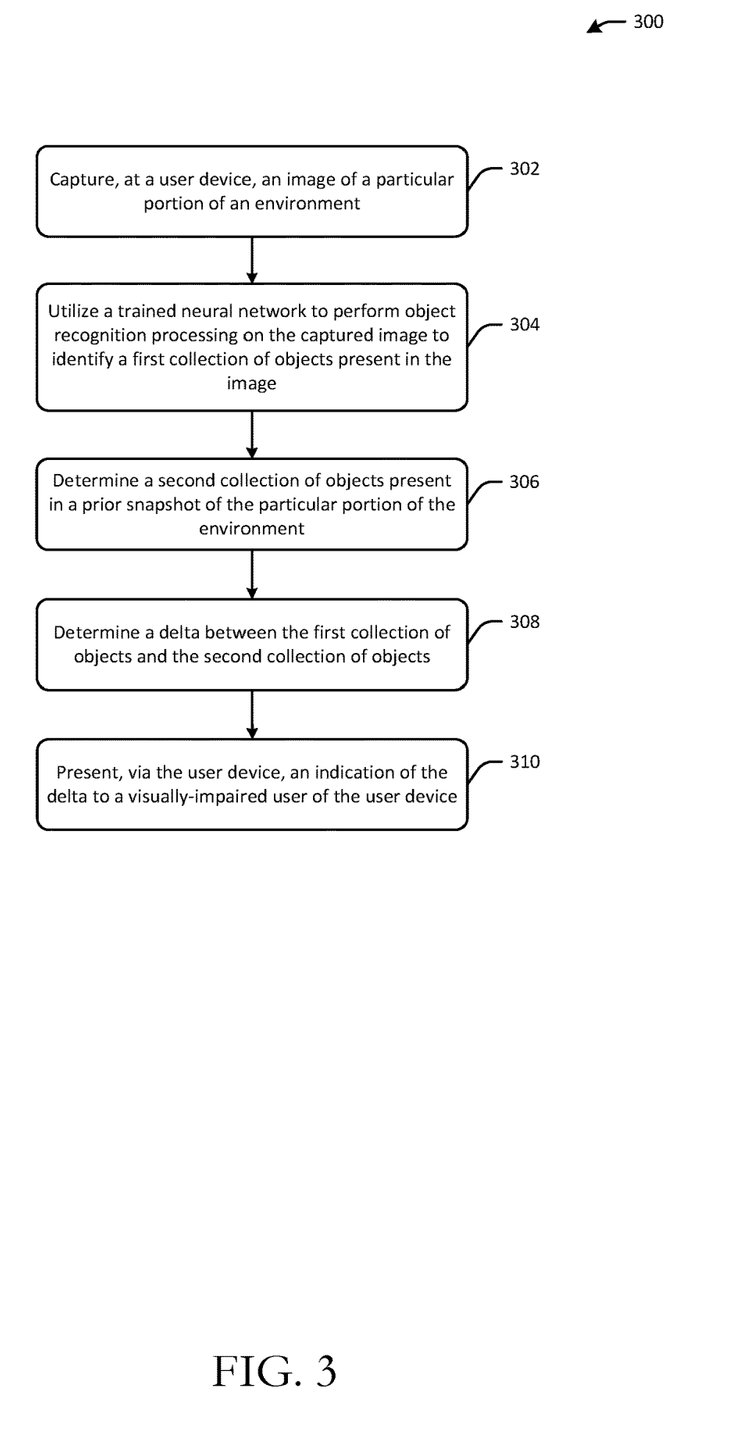
FIG. 3 is a process flow diagram of an illustrative method for determining a delta between cognitive snapshots of an environment taken at different points in time in accordance with one or more example embodiments.

FIG. 1 is a schematic hybrid data flow/block diagram illustrating the generation of cognitive snapshots of an environment in accordance with one or more example embodiments. FIG. 2 is a process flow diagram of an illustrative method 200 for generating a cognitive snapshot of an environment in accordance with one or more example embodiments. FIG. 3 is a process flow diagram of an illustrative method 300 for determining a delta between cognitive snapshots of an environment taken at different points in time in accordance with one or more example embodiments. Each of FIGS. 2 and 3 will be described in conjunction with FIG. 1 hereinafter.

FIG. 1 depicts a visually-impaired user 102, who may be present in an environment such as a public space. Example public spaces may include, without limitation, supermarkets, retail stores, venues, or the like. In example embodiments, when the visually-impaired user 102 enters a public space (e.g., a supermarket), the user 102 submits, at block 202 of the method 200, a voice command or other form of input (e.g., a gesture-based command) to a user device 104 to launch a user application 114 on the user device 104. In example embodiments, the user application is configured to generate cognitive snapshots of the environment to assist the visually-impaired user 102 in identifying objects and their relative placement within the environment. The user device may include, without limitation, a smartphone, a tablet, a personal digital assistant, or a wearable device such as glasses, a smart watch, or the like.

In example embodiments, the user 102 may be able to submit voice commands to the user device 104 via a wearable device 108 (e.g., a headset with a microphone and a speaker) that is configured to communicate with the user device 104 over a personal area network (PAN) 106 utilizing a Bluetooth communication protocol, for example, or another suitable PAN communication protocol. In certain example embodiments, the user 102 may utilize multiple wearable devices 108 to communicate with the user device 104. For instance, the user 102 may utilize a Bluetooth headset to submit voice commands to the user device 104 and receive audible output from the user device 104 as well as a wearable glove or the like that includes proprioceptive sensors to provide gesture-based input to the user device 104. In this manner, the user 102 can avoid having to provide voice-based commands in a public setting. Further, in example embodiments, the user device 104 itself may be a wearable device such as a smart watch, smart glasses, or the like that is capable of receiving voice or gesture-based commands via an integrated microphone; executing the user application 114; capturing images with an integrated image sensor (e.g., camera); and providing audible or haptic output.

The user device 104 may launch the user application 114 on the user device 104 by loading computer-executable code, instructions, or the like of the user application 114 into memory 112 of the user device 104. In example embodiments, the user application 114 may include various program modules configured to execute respective functionality of the user application 114 including, without limitation, one or more voice command modules 116; one or more location-based services (LBS) modules 118; one or more object recognition modules 120; one or more image tagging modules 122; and one or more cognitive snapshot delta determination modules 124. The memory 112 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Further, the memory 112 may include any of the types of memory described later in this disclosure in reference to FIG. 4.

In example embodiments, the user device 104 includes one or more processors 130 and data storage 132. The data storage 132 may include removable storage and/or non-removable storage including, but not limited to, magnetic storage, optical disk storage, and/or tape storage. The data storage 132 may provide non-volatile storage of computer-executable instructions and other data. The memory 112 and the data storage 132, removable and/or non-removable, are examples of computer-readable storage media (CRSM) as that term is used herein.

The data storage 132 may store computer-executable code, instructions, or the like that may be loadable into the memory 112 and executable by the processor(s) 130 to cause the processor(s) 130 to perform or initiate various operations. For instance, the various program modules of the user application 114 may be loadable from the data storage 132 into the memory 112 for execution by the processor(s) 130. The data storage 132 may additionally store data that may be copied to memory 112 for use by the processor(s) 130 during the execution of the computer-executable instructions. Moreover, output data generated as a result of execution of the computer-executable instructions by the processor(s) 130 may be stored initially in memory 112 and may ultimately be copied to data storage 132 for non-volatile storage.

The processor(s) 130 may be configured to access the memory 410 and execute computer-executable instructions loaded therein. For example, the processor(s) 130 may be configured to execute computer-executable instructions of the various program modules of the user application 114 to cause or facilitate various operations to be performed in accordance with one or more embodiments of the disclosure. The processor(s) 130 may include any type of suitable processing unit and may have any suitable microarchitecture design including any of those described later in this disclosure in reference to FIG. 4.

In example embodiments, at block 204 of the method 200, upon launching the user application 114 in response to the received user command, a current location of the user device 104 can be determined. More specifically, GPS coordinates of the user device 104 can be obtained from a GPS receiver 126 of the user device 104. Computer-executable instructions of the LBS module(s) 118 can be executed to compare the GPS coordinates to stored location information to determine the current location of the user device 104. For instance, based on this comparison, the user application 114 may determine that the user device 104 is currently located at the supermarket located at 123 Maple Street. In example embodiments, the data storage 132 may locally store the location information that is used as part of the determination of the current location of the user device 104. Alternatively, the user device 104 may access the location information from an external data store via a network connection.

In example embodiments, a more precise determination of the location of the user device 104 within the addressed location can be determined. In example embodiments, the user application 114 may utilize beacon-based micro-GPS coordinates of the user device 104, potentially along with prior images captured within the addressed location, to determine a more precise location of the user device 104 within the addressed location. For instance, the user application 114 may determine that the user device is located in proximity to the bakery section of the supermarket located at 123 Maple Street. In example embodiments, the user device 104 may provide audible output to the visually-impaired user 102 indicating the current location of the user 102 (e.g., "you are located near the bakery section at the supermarket located at 123 Maple Street").

In example embodiments, at block 206 of the method 200, the user application 114 guides the visually-impaired user 102 to position the user device 104 so that an image of a particular portion of the user's surrounding environment can be captured. Referring to the non-limiting example introduced earlier, the user application 114 may guide the visually-impaired user 102 to position the user device 104 across from the bakery section of the supermarket so that an image thereof can be captured. The user application 114 may cause the user device 104 to provide audible or haptic prompts to the user 102 to guide the user's positioning of the user device 104. Further, the user application 114 may cause the user device 104 to output an audible or haptic signal to the user 102 that indicates when the device 104 has been appropriately positioned. In example embodiments, the user device 104 may include one or more sensors 128, which may include an image sensor such as a camera, to automatically capture an image 110 at block 208 of the method 200 responsive to determining that the user device 104 has been appropriately positioned. In other example embodiments, the visually-impaired user 102 may submit a voice command prompting the user device 104 to capture the image 110 at block 208.

In example embodiments, at block 210 of the method 200, the captured image 110 is processed by a trained neural network (e.g., a convolutional neural network) or other machine-learning construct to perform object recognition on the captured image in order to identify a collection of objects present in the image. In example embodiments, computer-executable instructions of the object recognition module(s) 120 may be executed to process the image 110 using a specialty neural network that has been specifically trained to detect objects typically associated with the captured scene (e.g., items typically found in a bakery section of a supermarket). In example embodiments, the specialty neural network outputs a probability classification distribution that classifies all objects detected in the image 110 above a probability threshold. In example embodiments, objects detected in the image 110 may include, without limitation, items; scenes; faces; colors; and so forth. Further, in example embodiments, the specialty neural network may be specifically trained to detect objects that are deemed relevant to visually-impaired users. In certain example embodiments, computer-executable instructions of the image tagging module(s) 122 may be executed to enable the user 102 to tag the image 110 with a label indicative of an object or person known to be present in the image 110.

Example embodiments described in reference to FIG. 1 assume that the user device 104 has sufficient processing capacity to perform the object recognition locally. In other example embodiments, the object recognition may be performed, at least in part, on one or more remote servers. More generally, any of the program modules depicted as part of the user application 114 may instead reside, at least in part, on one or more remote servers. In example embodiments, the image 110 may be optionally processed to reduce its size and/or enhance image recognition capability and sent to an image recognition Application Programming Interface (API) executing on one or more remote servers. The image recognition API may be a RESTful API. In example embodiments, the API utilizes a neural network (e.g., a specialty neural network pre-trained to detect objects relevant to visually-impaired users) to identify a collection of objects present in the image 110. The API may then return an indication of the collection of identified objects to the user device 104 for presentation to the visually-impaired user 102. In certain example embodiments, the image 110 is stored as part of an image library on the remote server(s) for use in connection with training future object recognition.

At block 212 of the method 200, the user device 104 presents to the visually-impaired user 102 an audible listing or the like of the identified collection of objects. In example embodiments, the visually-impaired user 102 may be able to scroll the audible listing of objects using the wearable device 108 such as a glove that includes proprioceptive sensors. In addition, in example embodiments, if the current location is within a threshold distance of a location at which a prior snapshot (e.g., image) was captured, the collection of objects identified in the prior snapshot may also be presented to the visually-impaired user 102. In certain example embodiments, if the user 102 is visiting the location for the first time—as can be determined from historical GPS data—the entire listing of objects, potentially ordered by priority, is presented to the user 102. On the other hand, if the user 102 has visited the location in the past, a delta between the collection of objects identified in the image 110 and a collection of objects identified in a prior snapshot can be determined (as described in more detail later in this disclosure in reference to FIG. 3), and any new or removed objects can be presented to the user 102 first.

In certain example embodiments, the user application 114 may provide the user 102 with the capability to modify the listing of identified objects by submitting various voice or gesture-based commands. For instance, the user 102 may add a new object (e.g., a new item, a person, etc.) to the listing of objects that the user 102 is aware is present in the image but which was not identified by the object recognition processing. Alternatively, the user 102 may submit a new image containing the new object. As another non-limiting example, the user 102 may add a label or reference to an object identified in the image 110; delete an object from the identified listing of objects; and/or modify a label or reference assigned to an object identified in the image 110 (e.g., change "cilantro to parsley"). In example embodiments, when the user 102 adds a new object to the identified listing of objects, the neural network can be re-trained on the image 110. In example embodiments, when the user 102 modifies a label or reference for an object, a corresponding lookup table that associated labels/references with identified objects can be updated accordingly. In example embodiments, when an object is deleted from the listing of objects, stored images containing the deleted object may be deleted from the image library and the neural network may be re-trained for object recognition. Further, in example embodiments, the user 102 may request a listing of "special items" that are associated with a higher priority than other objects in the identified collection of objects. The user 102 may identify the "special items" or such items may be automatically identified by the user device 104 (or the remote server(s)) based on third-party data such as sales data.

In example embodiments, the visually-impaired user 102 may wish to locate a particular object among the identified collection of objects. In such example embodiments, the visually-impaired user 102 may submit a voice command to the user device 104 at block 214 of the method 200 indicating an intent to locate a particular object (e.g., "where are the everything bagels?"). In response, at block 216 of the method 200, the user application 114 may instruct the visually-impaired user 102 to scan the user device 104 across the particular portion of the environment that was captured in the image 110 (e.g., the bakery section of a supermarket) to facilitate identification of a more precise location of the desired object within the scanned environment. For instance, in example embodiments, the user application 114 may cause the user device 104 to output an audible or haptic signal that increases in intensity as the desired object approaches a field-of-view of the user device 104 (e.g., a field-of-view of an image sensor of the user device 104). When the desired object becomes aligned with a reference location on the user device 104 (e.g., a centerline within a field-of-view of a camera of the user device 104), the user device 104 may output, at block 218 of the method 200, an audible or haptic signal indicating that the desired object has been located, thereby enabling the visually-impaired user 102 to retrieve the desired object. In example embodiments, the sensor(s) 128 may further include inertial sensors such as an accelerometer, gyroscope, or the like that can determine, among other things, orientation of the user device 104, which can be used to enable proper positioning of the user device 104 prior to capturing the image 110 and proper alignment of the device 104 during the scan for the desired object.

In certain example embodiments, upon capturing the image 110 of the particular portion of the environment, the user application 114 may prompt the visually-impaired user 102 for input indicating what action the user 102 wishes to take. For instance, the user application 114 may ask the visually-impaired user 102 if she would like to hear the listing of objects identified in the captured image 110 or if she would like more information about a specific item such as its precise location in the environment, pricing information, availability, or the like. Further, in certain example embodiments, the user application 114 may inquire as to whether the visually-impaired user 102 would like to know what objects may have changed from a prior snapshot that was taken. In order to determine what objects may have changed from a prior snapshot, the user application 114 may be configured, in example embodiments, to determine a delta between the collection of objects identified in the captured image 110 and a collection of objects identified in a prior snapshot of the same portion of the environment. For instance, the user application may determine which objects may have been removed or replaced with other objects in the bakery section between when the current image 110 is captured and when the prior snapshot is captured. As another non-limiting example, the user application 114 may identify an object that is typically available but which is not currently available due to being out-of-stock or sold-out.

Referring now to FIG. 3, at block 302 of the method 300, the image 110 may be captured of the particular portion of an environment. Then, at block 304 of the method 300, object recognition processing may be performed on the image 110 using a trained neural network to identify a first collection of objects present in the image 110. The operations at blocks 302 and 304 may correspond to the operations at blocks 208 and 210, respectively. Then, at block 306 of the method 300, the user application 114 may determine a second collection of objects present in a prior snapshot of the particular portion of the environment. The second collection of objects in the prior snapshot may have previously been identified based on object recognition processing performed on the prior snapshot, and data indicative thereof may be stored in and access from the data storage 132, for example.

At block 308 of the method 300, computer-executable instructions of the cognitive snapshot delta determination module(s) 124 may be executed to determine a delta between the first collection of objects and the second collection of objects. More specifically, in certain example embodiments, the cognitive snapshot delta determination module(s) 124 may perform a text-based comparison of a listing of objects identified in the captured image 110 and a listing of objects identified in a prior snapshot. The user application 114 may then present an indication of this delta between the two collections of objects to the visually-impaired user 102 at block 310 of the method 300. For example, the user application 114 may inform the visually-impaired user that a particular type of pastry that is normally available is currently sold-out or that another item that was previously available when the prior snapshot was taken has now been discontinued.

Example embodiments of the invention provide various technical effects and improvements to computer technology and the functioning of a computer. For example, example embodiments provide the technical effect of machine-learning based assistance to a visually-impaired user to assist the user in navigating public spaces. This machine-learning based assistance is enabled by the technical features of automated object recognition of objects present in the user's environment based captured images of the environment; automated comparison of image snapshots taken at different points in time to determine how objects present in the environment change over time; and automated guidance to the visually-impaired user to navigate the environment and located particular desired objects. This technical effect of machine-learning based assistance can also be achieved by performing all processing locally on a user device of the visually-impaired user without requiring a network connection. These technical features represent a technical benefit over conventional solutions that require a human volunteer to guide the visually-impaired user through an environment using a network connection and which do not provide delta information between different snapshots. Thus, example embodiments of the invention improve the functioning of a computer with respect to automated machine-learning based guidance to a visually-impaired user.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 4:
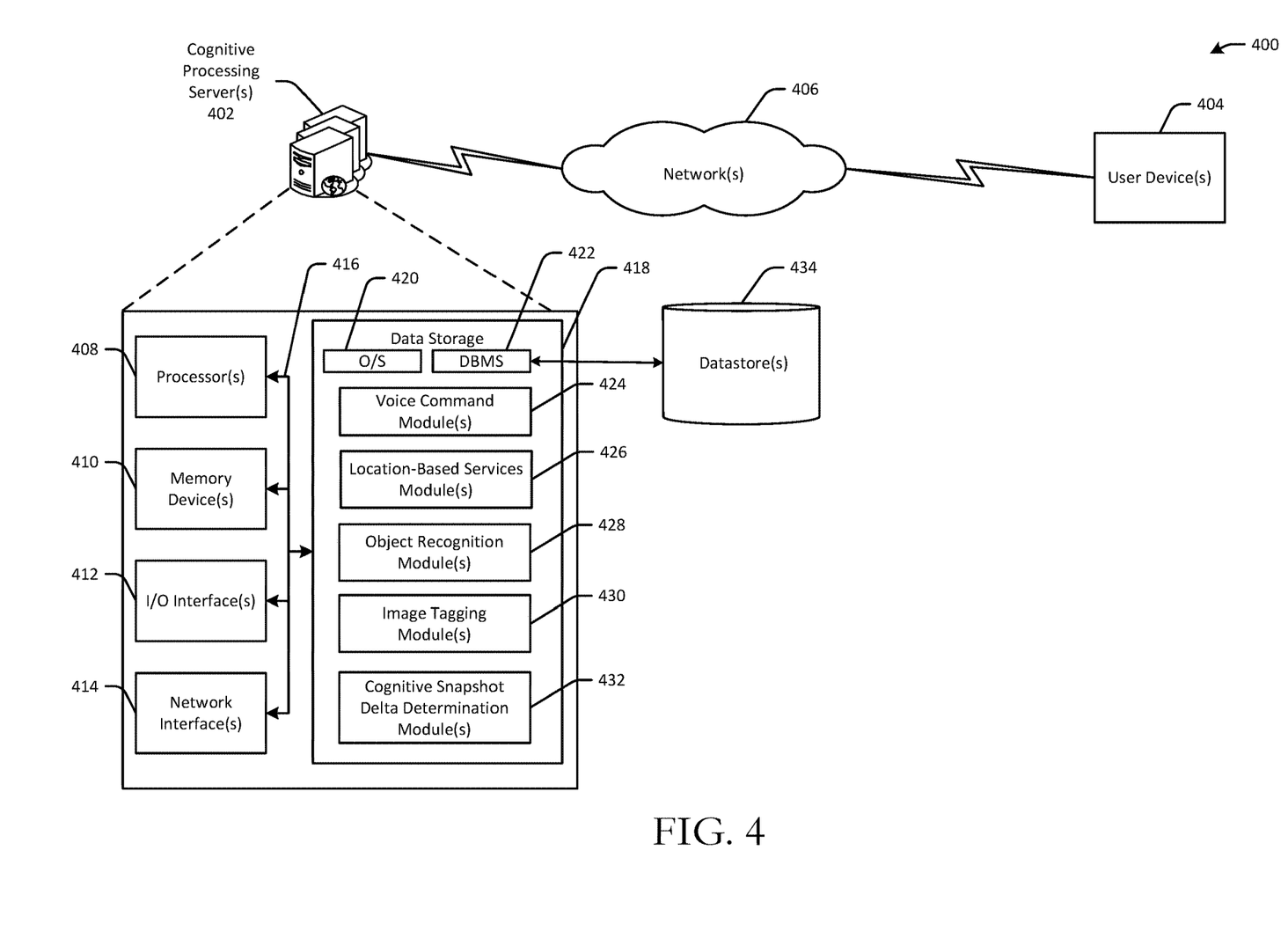
FIG. 4 is a schematic diagram of an illustrative networked architecture configured to implement one or more example embodiments.

FIG. 4 is a schematic diagram of an illustrative networked architecture 400 configured to implement one or more example embodiments of the disclosure. The illustrative networked architecture 400 includes one or more cognitive processing servers 402 configured to communicate via one or more networks 406 with one or more user devices 404. The user device(s) 404 may include, without limitation, a personal computer (PC), a tablet, a smartphone, a wearable device, a voice-enabled device, or the like. The user device(s) 404 may include the user device 104 and the wearable device 108 depicted in FIG. 1. While any particular component of the networked architecture 400 may be described herein in the singular, it should be appreciated that multiple instances of any such component may be provided, and functionality described in connection with a particular component may be distributed across multiple ones of such a component. FIG. 4 depicts an example architectural configuration in which processing described as being performed on the user device 104 in reference to FIG. 1 is performed, at least in part, on the cognitive processing server(s) 402.

The network(s) 406 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 406 may have any suitable communication range associated therewith and may include, for example, global networks (e.g., the Internet), metropolitan area networks (MANs), wide area networks (WANs), local area networks (LANs), or personal area networks (PANs). In addition, the network(s) 406 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the cognitive processing server 402 may include one or more processors (processor(s)) 408, one or more memory devices 410 (generically referred to herein as memory 410), one or more input/output ("I/O") interface(s) 412, one or more network interfaces 414, and data storage 418. The cognitive processing server 402 may further include one or more buses 416 that functionally couple various components of the cognitive processing server 402.

The bus(es) 416 may include at least one of a system bus, a memory bus, an address bus, or a message bus, and may permit the exchange of information (e.g., data (including computer-executable code), signaling, etc.) between various components of the cognitive processing server 402. The bus(es) 416 may include, without limitation, a memory bus or a memory controller, a peripheral bus, an accelerated graphics port, and so forth. The bus(es) 416 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 410 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 410 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 410 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 418 may include removable storage and/or non-removable storage including, but not limited to, magnetic storage, optical disk storage, and/or tape storage. The data storage 418 may provide non-volatile storage of computer-executable instructions and other data. The memory 410 and the data storage 418, removable and/or non-removable, are examples of computer-readable storage media (CRSM) as that term is used herein.

The data storage 418 may store computer-executable code, instructions, or the like that may be loadable into the memory 410 and executable by the processor(s) 408 to cause the processor(s) 408 to perform or initiate various operations. The data storage 418 may additionally store data that may be copied to memory 410 for use by the processor(s) 408 during the execution of the computer-executable instructions. Moreover, output data generated as a result of execution of the computer-executable instructions by the processor(s) 408 may be stored initially in memory 410 and may ultimately be copied to data storage 418 for non-volatile storage.

More specifically, the data storage 418 may store one or more operating systems (O/S) 420; one or more database management systems (DBMS) 422 configured to access the memory 410 and/or one or more external datastores 434; and one or more program modules, applications, engines, managers, computer-executable code, scripts, or the like such as, for example, one or more voice command modules 424; one or more LBS modules 426; one or more object recognition modules 428; one or more image tagging modules 430; and one or more cognitive snapshot delta determination modules 432. Any of the components depicted as being stored in data storage 418 may include any combination of software, firmware, and/or hardware. The software and/or firmware may include computer-executable instructions (e.g., computer-executable program code) that may be loaded into the memory 410 for execution by one or more of the processor(s) 408 to perform any of the operations described earlier in connection with correspondingly named modules/engines.

Although not depicted in FIG. 4, the data storage 418 may further store various types of data utilized by components of the cognitive processing server 402 (e.g., data stored in the datastore(s) 434). Any data stored in the data storage 418 may be loaded into the memory 410 for use by the processor(s) 408 in executing computer-executable instructions. In addition, any data stored in the data storage 418 may potentially be stored in the external datastore(s) 434 and may be accessed via the DBMS 422 and loaded in the memory 410 for use by the processor(s) 408 in executing computer-executable instructions.

The processor(s) 408 may be configured to access the memory 410 and execute computer-executable instructions loaded therein. For example, the processor(s) 408 may be configured to execute computer-executable instructions of the various program modules, applications, engines, managers, or the like of the cognitive processing server 402 to cause or facilitate various operations to be performed in accordance with one or more embodiments of the disclosure. The processor(s) 408 may include any suitable processing unit capable of accepting data as input, processing the input data in accordance with stored computer-executable instructions, and generating output data. The processor(s) 408 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 408 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 408 may be capable of supporting any of a variety of instruction sets.

Referring now to other illustrative components depicted as being stored in the data storage 418, the O/S 420 may be loaded from the data storage 418 into the memory 410 and may provide an interface between other application software executing on the cognitive processing server 402 and hardware resources of the cognitive processing server 402. More specifically, the O/S 420 may include a set of computer-executable instructions for managing hardware resources of the cognitive processing server 402 and for providing common services to other application programs. In certain example embodiments, the O/S 420 may include or otherwise control the execution of one or more of the program modules, engines, managers, or the like depicted as being stored in the data storage 418. The O/S 420 may include any operating system now known or which may be developed in the future including, but not limited to, any server operating system, any mainframe operating system, or any other proprietary or non-proprietary operating system.

The DBMS 422 may be loaded into the memory 410 and may support functionality for accessing, retrieving, storing, and/or manipulating data stored in the memory 410, data stored in the data storage 418, and/or data stored in external datastore(s) 434. The DBMS 422 may use any of a variety of database models (e.g., relational model, object model, etc.) and may support any of a variety of query languages. The DBMS 422 may access data represented in one or more data schemas and stored in any suitable data repository. Data stored in the datastore(s) 434 may include, for example, baseline risk profiles; sensor data; cognitive analysis data; etc. External datastore(s) 434 that may be accessible by the cognitive processing server 402 via the DBMS 422 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the cognitive processing server 402, the input/output (I/O) interface(s) 412 may facilitate the receipt of input information by the cognitive processing server 402 from one or more I/O devices as well as the output of information from the cognitive processing server 402 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the cognitive processing server 402 or may be separate. The I/O devices may further include, for example, any number of peripheral devices such as data storage devices, printing devices, and so forth.

The I/O interface(s) 412 may also include an interface for an external peripheral device connection such as universal serial bus (USB), FireWire, Thunderbolt, Ethernet port or other connection protocol that may connect to one or more networks. The I/O interface(s) 412 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The cognitive processing server 402 may further include one or more network interfaces 414 via which the cognitive processing server 402 may communicate with any of a variety of other systems, platforms, networks, devices, and so forth. The network interface(s) 414 may enable communication, for example, with one or more other devices via one or more of the network(s) 406.

It should be appreciated that the program modules/engines depicted in FIG. 4 as being stored in the data storage 418 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the cognitive processing server 402 and/or other computing devices accessible via one or more networks, may be provided to support functionality provided by the modules depicted in FIG. 4 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the cognitive processing server 402 may include alternate and/or additional hardware, software, or firmware components beyond those described or depicted without departing from the scope of the disclosure. More particularly, it should be appreciated that software, firmware, or hardware components depicted as forming part of the cognitive processing server 402 are merely illustrative and that some components may not be present or additional components may be provided in various embodiments. While various illustrative modules have been depicted and described as software modules stored in data storage 418, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations the method 200 and/or the method 300 may be performed by one or more cognitive processing servers 402 having the illustrative configuration depicted in FIG. 4, or more specifically, by one or more program modules, engines, applications, or the like executable on such a device. It should be appreciated, however, that such operations may be implemented in connection with numerous other device configurations.

The operations described and depicted in the illustrative methods of FIGS. 2A, 2B, and 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2A, 2B, and 3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for providing machine learning-based assistance to a user, the method comprising:
   receiving, at a user device, a first voice command from the user to launch a user application on the user device;
   guiding, by the user application, the user to position the user device such that a particular portion of an environment is within a field-of-view of an image sensor of the user device;
   capturing, by the image sensor, an image of the particular portion of the environment;
   identifying a first collection of objects present in the captured image based at least in part on object recognition processing performed on the captured image;
   presenting, via the user device, an indication of the first collection of objects to the user;
   receiving, at the user device, a second voice command to locate a particular object among the first collection of objects;
   instructing, by the user application, the user to scan the user device across the particular portion of the environment, wherein the instructing comprises causing the user device to output a haptic signal to the user that increases in intensity as the particular object approaches a centerline within a field-of-view of the image sensor; and
   responsive to detecting the particular object at the centerline within the field of view of the image sensor of the user device, outputting, via the user device, a signal to the user indicative of detection of the particular object at the centerline within the field-of-view of the image sensor of the user device.

2. The computer-implemented method of claim 1, wherein presenting the indication of the first collection of objects comprises outputting an audible listing of the first collection of objects via a speaker of the user device, wherein the audible listing is capable of being scrolled through based at least in part on input received from a wearable device of the user.

3. The computer-implemented method of claim 1, further comprising identifying the particular portion of the environment based at least in part on location-based coordinates of the user device, stored location information associated with the environment, and prior image data captured of the environment.

4. A user device for providing machine learning-based assistance to a user, the system comprising:
   an image sensor;
   at least one memory storing computer-executable instructions; and
   at least one processor, wherein the at least one processor is configured to access the at least one memory and execute the computer-executable instructions to:
      receive a first voice command from the user to launch a user application on the user device;
      guide, by the user application, the user to position the user device such that a particular portion of an environment is within a field-of-view of the image sensor;
      capture, by the image sensor, an image of the particular portion of the environment;
      identify a first collection of objects present in the captured image based at least in part on image recognition processing performed on the captured image;
      present an indication of the first collection of objects to the user;
      receive a second voice command to locate a particular object among the first collection of objects;
      instruct the user to scan the user device across the particular portion of the environment, wherein the instructing comprises causing the user device to output a haptic signal to the user that increases in intensity as the particular object approaches a centerline within a field-of-view of the image sensor; and
      responsive to detecting the particular object at the centerline within the field of view of the image sensor of the user device, output a signal to the user indicative of detection of the particular object at the centerline within the field-of-view of the image sensor of the user device.

5. The user device of claim 4, wherein the at least one processor is configured to present the indication of the first collection of objects by executing the computer-executable instructions to output an audible listing of the first collection of objects via a speaker of the user device, wherein the audible listing is capable of being scrolled through based at least in part on input received from a wearable device of the user.

6. The user device of claim 4, wherein the at least one processor is further configured to execute the computer-executable instructions to identify the particular portion of the environment based at least in part on location-based coordinates of the user device, stored location information associated with the environment, and prior image data captured of the environment.

7. A computer program product for providing machine-learning based assistance to a user, the computer program product comprising a non-transitory storage medium readable by a processing circuit, the storage medium storing instructions executable by the processing circuit to cause a method to be performed, the method comprising:

receiving, at a user device configured to be worn or carried by a user, a voice command from the user to launch a user application on the user device;

guiding, by the user application, the user to position the user device such that a particular portion of an environment is within a field-of-view of an image sensor of the user device;

capturing, by the image sensor, an image of the particular portion of the environment;

identifying a first collection of objects present in the captured image based at least in part on object recognition processing performed on the captured image;

presenting, via the user device, an indication of the first collection of objects to the user;

receiving, at the user device, a second voice command to locate a particular object among the first collection of objects;

instructing, by the user application, the user to scan the user device across the particular portion of the environment, wherein the instructing comprises causing the user device to output a haptic signal to the user that increases in intensity as the particular object approaches a centerline within a field-of-view of the image sensor; and responsive to detecting the particular object at the centerline within the field of view of the image sensor of the user device, outputting, via the user device, a signal to the user indicative of detection of the particular object at the centerline within the field-of-view of the image sensor of the user device.

8. The computer program product of claim 7, wherein presenting the indication of the first collection of objects comprises outputting an audible listing of the first collection of objects via a speaker of the user device, wherein the audible listing is capable of being scrolled through based at least in part on input received from a wearable device of the user.

9. The computer-implemented method of claim 1, further comprising:

determining a current location of the user device;

determining that the current location of the user device is within a threshold distance of a location in the environment at which a prior image was captured;

determining a second collection of objects present in the prior image; and presenting, via the user device, an indication of the second collection of objects to the user.

10. The computer-implemented method of claim 9, further comprising:

prompting, via the user device, the user for input to indicate whether the user would like to be notified of any differences between the first collection of objects and the second collection of objects;

receiving, in response to the prompting, an indication that the user would like to be notified of any differences between the first collection of objects and the second collection of objects;

determining, in response to receiving the indication that the user would like to be notified of any differences, a delta between the first collection of objects and the second collection of objects; and presenting, via the user device, an indication of the delta between the first collection of objects and the second collection of objects to the user.

11. The user device of claim 4, wherein the at least one processor is further configured to execute the computer-executable instructions to:

determine a current location of the user device;

determine that the current location of the user device is within a threshold distance of a location in the environment at which a prior image was captured;

determine a second collection of objects present in the prior image; and present an indication of the second collection of objects to the user.

12. The user device of claim 11, wherein the at least one processor is further configured to execute the computer-executable instructions to:

prompt the user for input to indicate whether the user would like to be notified of any differences between the first collection of objects and the second collection of objects;

receive, in response to the prompting, an indication that the user would like to be notified of any differences between the first collection of objects and the second collection of objects;

determine, in response to receiving the indication that the user would like to be notified of any differences, a delta between the first collection of objects and the second collection of objects; and present an indication of the delta between the first collection of objects and the second collection of objects to the user.

13. The computer program product of claim 7, wherein the method further comprises:

determining a current location of the user device;

determining that the current location of the user device is within a threshold distance of a location in the environment at which a prior image was captured;

determining a second collection of objects present in the prior image; and presenting, via the user device, an indication of the second collection of objects to the user.

14. The computer program product of claim 13, wherein the method further comprises:

prompting, via the user device, the user for input to indicate whether the user would like to be notified of any differences between the first collection of objects and the second collection of objects;

receiving, in response to the prompting, an indication that the user would like to be notified of any differences between the first collection of objects and the second collection of objects;

determining, in response to receiving the indication that the user would like to be notified of any differences, a delta between the first collection of objects and the second collection of objects; and presenting, via the user device, an indication of the delta between the first collection of objects and the second collection of objects to the user.

* * * * *